United States Patent Office 3,336,314
Patented Aug. 15, 1967

3,336,314
O-QUINOLINYL S-ALKYL-ALKYLPHOS-
PHONODITHIOATES
Thomas Mason Melton, Richmond, Va., assignor to Mobil
Oil Corporation, a corporation of New York
No Drawing. Filed Dec. 2, 1964, Ser. No. 415,462
2 Claims. (Cl. 260—283)

This invention concerns new organophosphorus compounds, compositions thereof, and their use as insecticides and miticides. In general it relates to phosphonodithioates of the formula

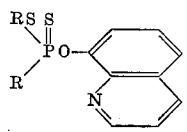

wherein R is a lower alkyl.

The new compounds of the present invention are insecticidal and miticidal agents which may be used in various areas, as for example in protecting plants from attack by these pests.

Useful formulations containing from about 0.01 to about 1.0 of the chemical may be prepared by mixing them with liquids, or with finely divided solid carriers or extenders. For example, the compound may be mixed with any finely divided solid carrier which will aid in its uniform distribution. As a general rule, solid carriers which are acceptable are those which are nonhygroscopic, thereby preventing the combination from caking. Some useful solid carriers are granular or finely divided koalinite, bentonite, attapulgite, and the like.

The new products may be used also in oils, or as a component in water emulsions or dispersions. An effective liquid formulation may include the compound, a volatile, non-phytotoxic solvent such as acetone, water, and a small amount of a surface active agent. As an example of those surface active agents which the art will recognize as useful is Tween-20 (polyoxyethylene sorbitan monolaurate).

In the control of insects and mites, any method which assures contact of the pests with a lethal quantity of the active component will suffice. These methods are well understood in the pesticide art. As examples of effective means of controlling these pests, infested plants may be treated by dusting with solid formulations in the same manner as for other materials such as DDT, or by spraying a liquid formulation just to the point of run off.

The new compounds of the invention may be prepared by reacting a compound of the formula $$C_3H_7S(CH_3)P(S)Cl$$

with the nitrogen-containing ring structure defined above. Generally, the compounds can be obtained in good yield by reacting equivalent quantities of the phosphonohalidite and nitrogen containing member in the presence of an inert organic solvent and an acid acceptor. With respect to temperature, it has been found that the reaction proceeds in a satisfactory manner at about 60° C. After the reaction is complete, the product may be separated conventionally, i.e. by removing the hydrochloride by filtration, by washing the mixture, or by a combination of these, followed by fractional distillation of the solvent and product.

As indicated in the above discussion of the general preparation of the inventive compounds, the reaction is preferably run in the presence of an inert organic solvent and an acid acceptor. The preferred acid acceptor is a tertiary amine such as triethyl-, tripropyl-, tributyl-amine, and the like, but others, as for example, alkali metal hydroxides, may also be used. The examples which follow will indicate the variety of inert organic solvents which may be used. The useful solvents are not limited to these, however. In general any inert organic solvent will be suitable provided that the product, and preferably the reactants also, are soluble therein, and provided further that its boiling point is not so high as to present difficulties upon removal of the product therefrom.

Having described the compounds and their utility in a general way, the following will specifically illustrate their preparation and the manner of using them as insecticides and miticides. "Parts" are parts by weight.

EXAMPLE 1

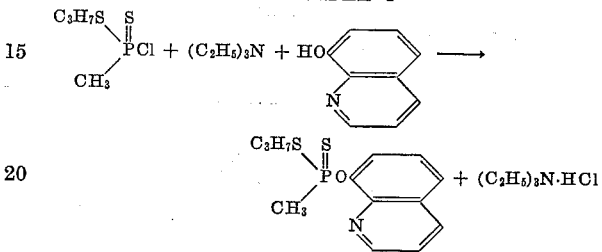

8-hydroxyquinoline, 14.5 parts, 44 parts of benzene and 10.1 parts of triethylamine were placed in a suitable reaction vessel equipped with a stirrer, thermometer, reflux condenser and liquid addition means. 18.9 parts of S-propyl methylphosphono chloridodithioate was added to the stirred mixture at room temperature over a period of one minute. The reaction was only slightly exothermic. After the addition, the mixture was stirred for two hours to complete the reaction. It was then allowed to stand for several hours. The amine hydrochloride was removed by filtration, the percipitate was washed twice with 22 parts of benzene, and the solvent was removed by distillation at 60° C. to a pressure of 30 mm. of Hg. The distilled product had the following properties:

Boiling point, 179–184° C. at 0.065 mm. of Hg.
Refractive index, 1.6286 at 31° C.
P (calculated), 10.42%; P (found), 11.39%.
S (calculated), 21.85%; S (found), 21.76%.

Procedure for testing as insecticides

Solutions of the chemicals of this invention were prepared in acetone such that each ml. contained 8 or 2 mg. of the active component. Three grams of whole wheat flour were placed in each of several 20 x 90 petri dishes, and three of these were used for each chemical at each concentration. The acetone containing the chemical was placed on the flour and was mixed thoroughly therewith. After allowing time for the acetone to evaporate, the flour was pushed to one side, adult confused flour beetles, *Tribolium confusum*, were placed on the flour, and the dishes were covered. 48 hours later, the results were taken and reported as averages of the replicate tests on each chemical at the specified concentration.

Procedure for testing as contact miticides

Black Valentine bean plants, *Phaseolus vulgaris*, were grown in 4-inch pots. These plants were inoculated with two-spotted spider mites, *Tetranychus bimaculatus*, when the first trifoliate leaves were mature. Inoculation was accomplished by cutting small strips of infested beans and placing them on the clean leaves.

Solutions containing 0.05% and 0.0125% of the inventive chemicals were made as follows: 100 mg. or 25 mg., respectively, was dissolved in 10 ml. of acetone and placed in 190 ml. of water containing 1½ ml. of Tween-20. In spraying the infested plants, 40 ml. of each of these solutions was sprayed, to run-off, on 3 plants. Results were taken 7 days later, and an average rate of control was obtained with reference to the 3 plants.

The following table shows the results obtained using the above procedures.

| Compound | Rate | Percent Kill as Insecticide | Percent Kill as Miticide |
|---|---|---|---|
| Example 1 | 8 mg | 100 | |
| | 2 mg | 84 | |
| | .05% | | 100 |
| | .0125% | | 50 |

I claim:
1. A compound of the formula

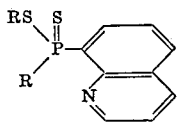

wherein R is a lower alkyl.

2. The compound of the formula

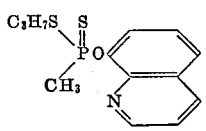

References Cited

UNITED STATES PATENTS

| | | | |
|---|---|---|---|
| 2,359,391 | 10/1944 | Seymour et al. | 260—289 |
| 2,478,125 | 8/1949 | Northey et al. | 260—289 |
| 2,686,783 | 7/1954 | Morrison et al. | 260—286 |
| 2,706,194 | 4/1955 | Morris et al. | 260—290 X |
| 2,818,366 | 12/1957 | Birum | 167—22 |
| 2,906,661 | 9/1959 | Baker et al. | 167—22 |
| 3,077,433 | 2/1963 | Holysz | 167—330 |
| 3,082,240 | 3/1963 | Lorenz et al. | 260—461.110 |
| 3,097,132 | 7/1963 | Wiegand et al. | 167—330 |
| 3,121,662 | 2/1964 | Schrader | 260—461.110 X |
| 3,134,775 | 5/1964 | Floyd | 260—461.110 X |
| 3,170,854 | 2/1965 | Kroll | 260—286 X |
| 3,216,894 | 11/1965 | Lorenz et al. | 167—22 |

ALEX MAZEL, *Primary Examiner.*

JULIAN S. LEVITT, HENRY R. JILES, *Examiners.*

STANLEY J. FRIEDMAN, DONALD G. DAUS,
*Assistant Examiners.*